United States Patent
Cage et al.

(10) Patent No.: US 11,283,745 B2
(45) Date of Patent: Mar. 22, 2022

(54) DIFFERENT SPECIFIC MESSAGING TO MULTIPLE RECIPIENTS FROM A SINGLE MESSAGE

(71) Applicants: Kailyn Cage, Bowie, MD (US); Luis Santos, College Park, MD (US)

(72) Inventors: Kailyn Cage, Bowie, MD (US); Luis Santos, College Park, MD (US)

(*) Notice: Subject to any disclaimer, the term of this patent is extended or adjusted under 35 U.S.C. 154(b) by 0 days.

(21) Appl. No.: 15/250,900

(22) Filed: Aug. 29, 2016

(65) Prior Publication Data
US 2018/0205687 A1    Jul. 19, 2018

(51) Int. Cl.
| | |
|---|---|
| H04L 12/58 | (2006.01) |
| G06F 40/103 | (2020.01) |
| G06F 11/34 | (2006.01) |
| G06F 11/36 | (2006.01) |
| G06F 15/16 | (2006.01) |
| H04L 51/00 | (2022.01) |
| G06Q 10/10 | (2012.01) |
| G06F 40/117 | (2020.01) |
| G06F 40/131 | (2020.01) |
| G06F 40/166 | (2020.01) |
| G06F 40/197 | (2020.01) |

(52) U.S. Cl.
CPC ........... *H04L 51/14* (2013.01); *G06F 40/117* (2020.01); *G06F 40/131* (2020.01); *G06F 40/166* (2020.01); *G06F 40/197* (2020.01); *G06Q 10/107* (2013.01); *H04L 51/12* (2013.01)

(58) Field of Classification Search
CPC ........ H04L 51/14; H04L 51/12; G06F 17/218
USPC .......................................................... 709/206
See application file for complete search history.

(56) References Cited

U.S. PATENT DOCUMENTS

| | | | | |
|---|---|---|---|---|
| 6,192,396 | B1* | 2/2001 | Kohler ................. | G06Q 10/107 707/999.005 |
| 7,072,942 | B1* | 7/2006 | Maller ..................... | H04L 51/12 709/206 |
| 9,280,520 | B2* | 3/2016 | Guenigault ............... | G06F 3/14 |
| 2005/0210106 | A1* | 9/2005 | Cunningham .......... | H04L 51/12 709/206 |
| 2005/0289106 | A1* | 12/2005 | Petri ....................... | G06F 16/14 |
| 2006/0143278 | A1* | 6/2006 | Bauchot ............... | G06Q 10/107 709/206 |
| 2006/0277263 | A1* | 12/2006 | Daniels ................ | G06Q 10/107 709/206 |
| 2007/0005713 | A1* | 1/2007 | LeVasseur .............. | H04L 51/18 709/206 |
| 2007/0106735 | A1* | 5/2007 | Hardy, Jr. ............. | H04L 51/063 709/206 |
| 2007/0106736 | A1* | 5/2007 | Shepherd ............. | G06Q 10/107 709/206 |
| 2007/0106738 | A1* | 5/2007 | Barnes .................... | H04L 51/12 709/206 |
| 2008/0147818 | A1* | 6/2008 | Sabo ...................... | G06Q 10/00 709/206 |
| 2009/0177673 | A1* | 7/2009 | Cunningham .......... | H04L 51/12 |

(Continued)

*Primary Examiner* — Emmanuel L Moise
*Assistant Examiner* — Berhanu Shitayewoldetadik
(74) *Attorney, Agent, or Firm* — Wood IP LLC

(57) ABSTRACT

The present invention allows multiple different messages to different recipients through a single email. The system allows a sender to designate multiple recipients in the subject areas and the composition areas of the email application and send different messages to each recipient.

1 Claim, 14 Drawing Sheets

Different composed messages and subjects messages are sent individually through the same email. Items are labeled and categorized.

(56) References Cited

U.S. PATENT DOCUMENTS

| | | | |
|---|---|---|---|
| 2010/0161566 A1* | 6/2010 | Adair | G06F 16/2462 707/690 |
| 2010/0198928 A1* | 8/2010 | Almeida | G06Q 10/107 709/206 |
| 2011/0202756 A1* | 8/2011 | West | H04L 51/08 713/152 |
| 2012/0317222 A1* | 12/2012 | Almeida | H04L 51/28 709/206 |
| 2013/0007154 A1* | 1/2013 | Chakra | H04L 51/14 709/206 |
| 2013/0054710 A1* | 2/2013 | Abou Mahmoud | G06Q 10/107 709/206 |
| 2013/0080775 A1* | 3/2013 | Liebmann | H04L 63/0428 713/168 |
| 2013/0086181 A1* | 4/2013 | Vitaldevara | H04L 51/12 709/206 |
| 2013/0212185 A1* | 8/2013 | Pasquero | G06Q 10/10 709/206 |
| 2014/0095628 A1* | 4/2014 | Chandak | H04L 12/1859 709/206 |
| 2014/0289258 A1* | 9/2014 | Joshi | G06Q 10/107 707/741 |
| 2015/0058428 A1* | 2/2015 | Caskey | H04L 51/02 709/206 |
| 2015/0295871 A1* | 10/2015 | Greenstein | H04L 51/34 709/206 |
| 2015/0348551 A1* | 12/2015 | Gruber | H04M 3/4936 704/235 |

* cited by examiner

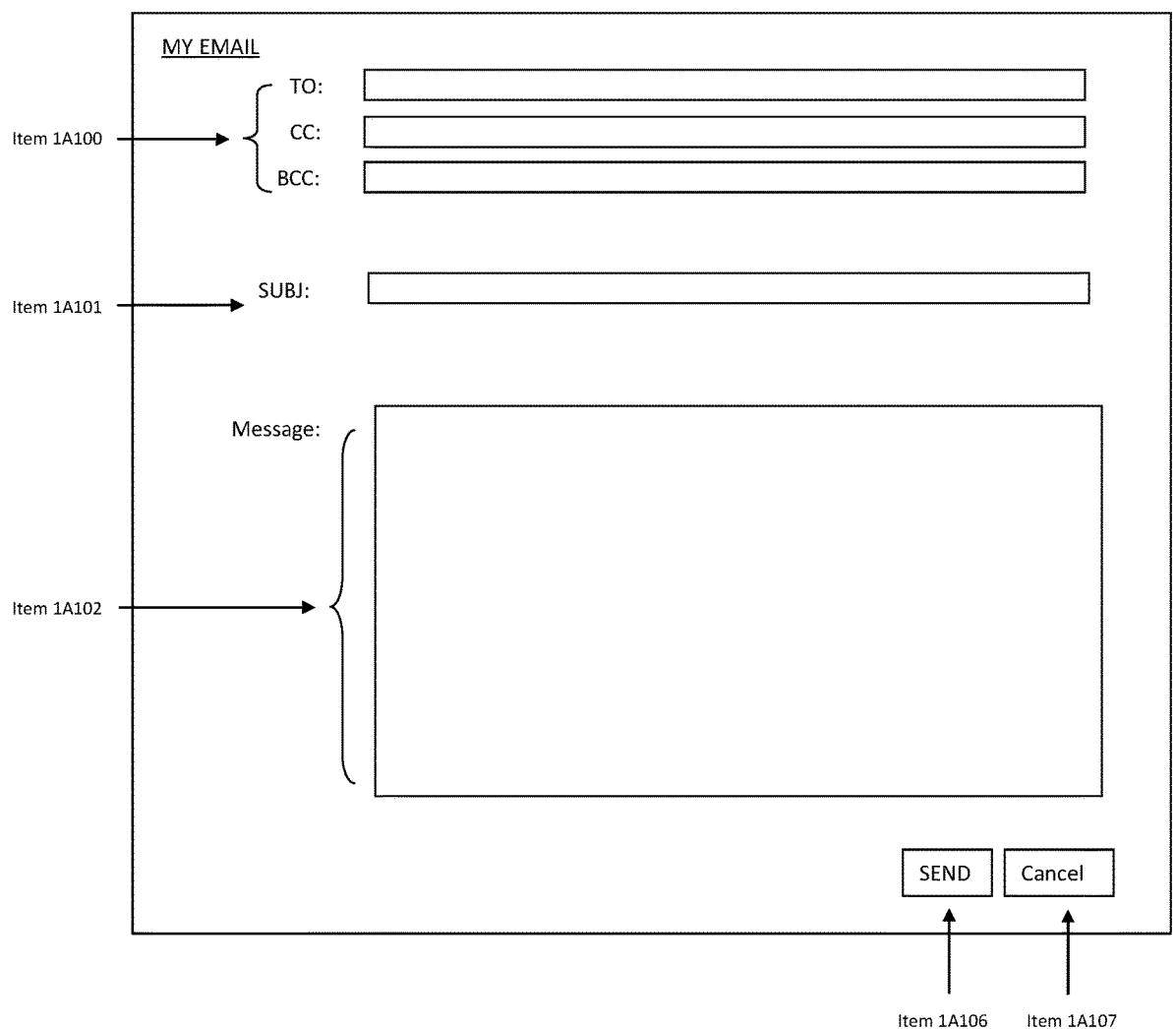
Fig 1A: An illustrative GUI for a standard email application.

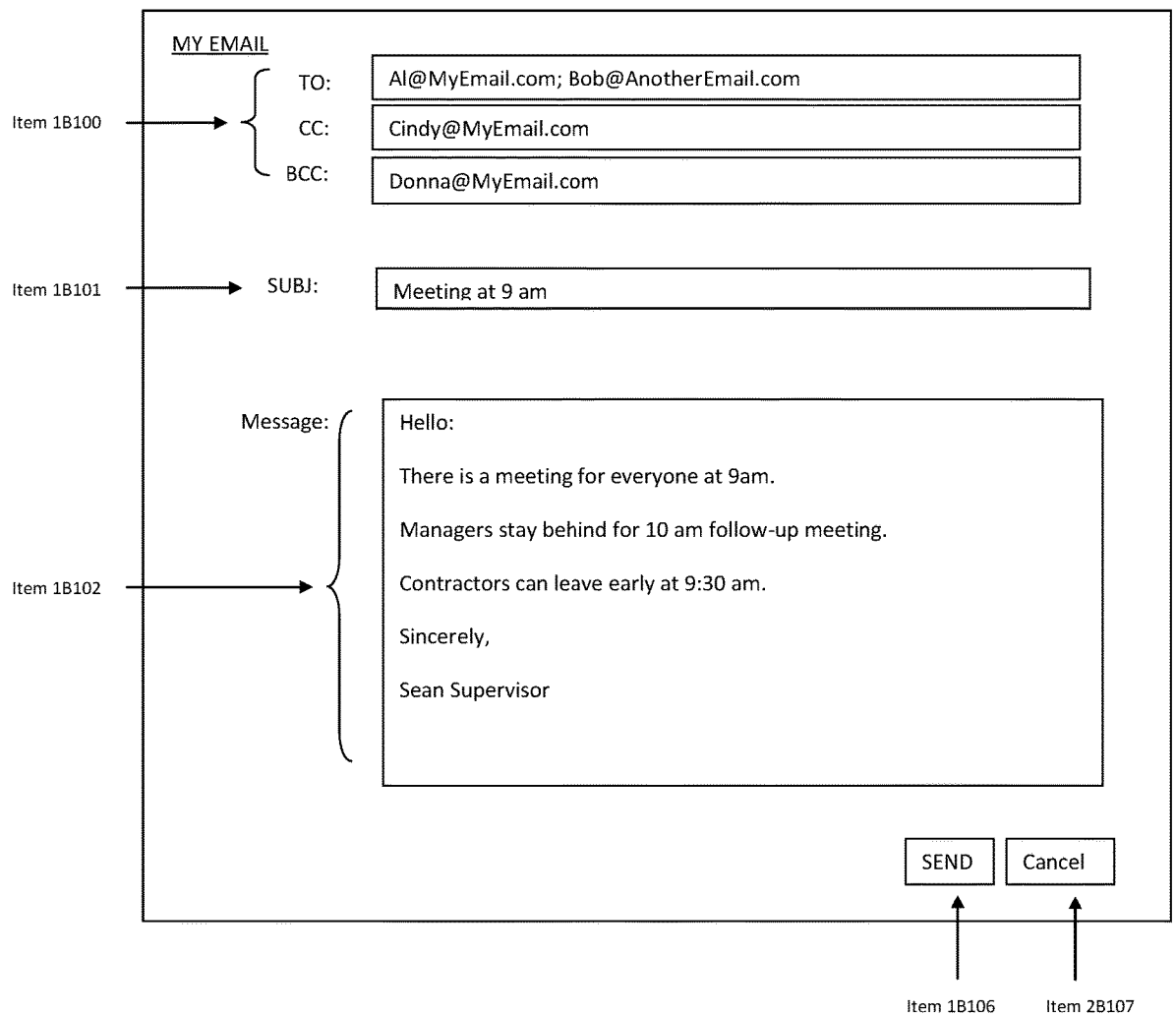
Fig 1B: Messages and recipients in a standard email application.

Recipients from a standard email

---

FROM: Sean@MyEmail.com

TO: Al@MyEmail.com; Bob@MyEmail.com

CC: Cindy@MyEmail.com

SUBJECT: Meeting at 9 am

---Original Message--

There is a meeting for everyone at 9am.

Managers stay behind for 10 am follow-up meeting.

Contractors can leave early at 9:30 am.

Sincerely,

Sean Supervisor

---

Fig 1C: All recipients Al, Bob, Cindy, and Donna receive the general composed message. Donna is BCC'd, so her information is not displayed on the header.

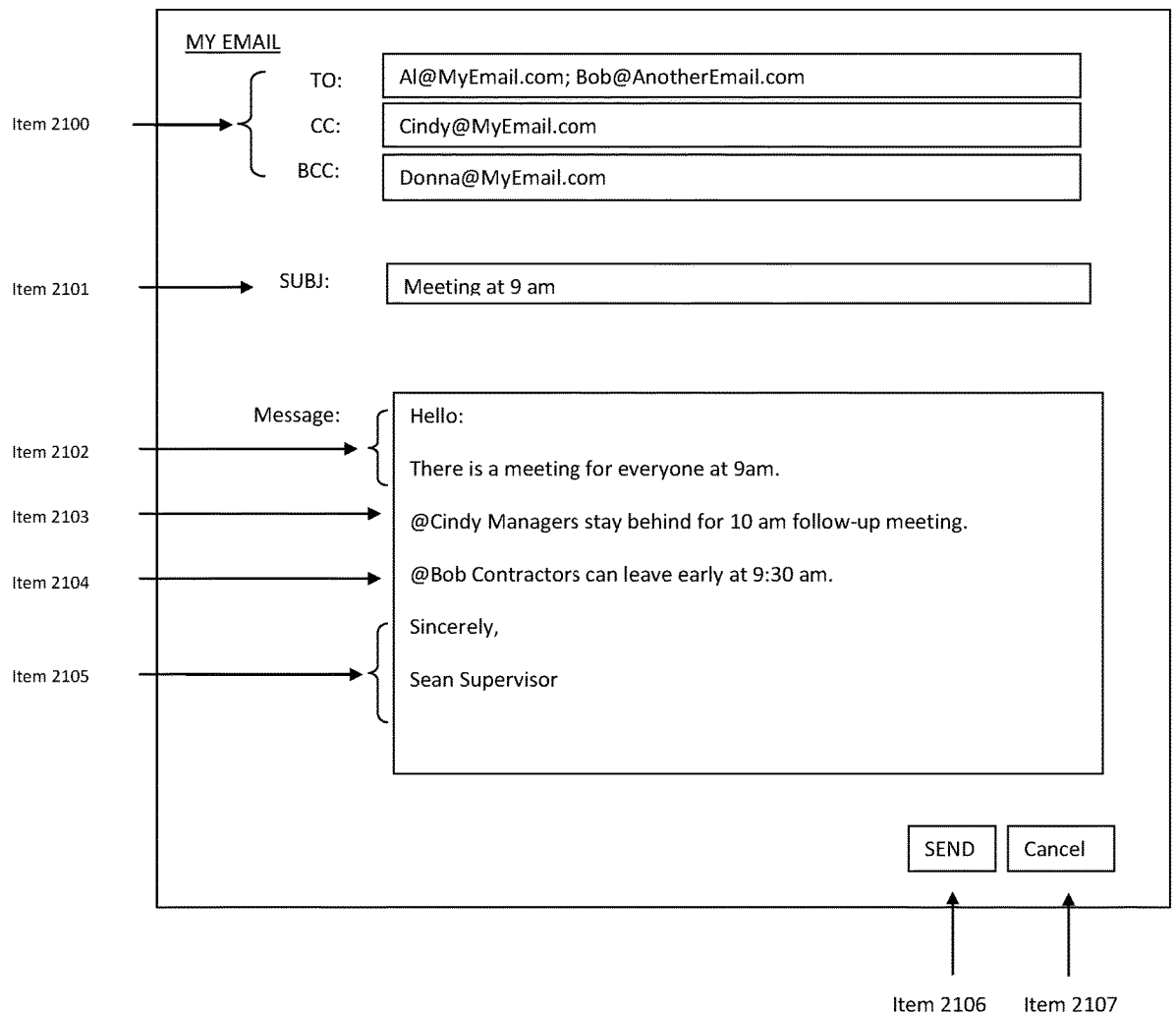
Fig 2: Different composed messages are sent individually through the same email.

Recipients Al and Donna

FROM: Sean@MyEmail.com

TO: Al@MyEmail.com; Bob@MyEmail.com

CC: Cindy@MyEmail.com

SUBJECT: Meeting at 9 am

---Original Message--

There is a meeting for everyone at 9am.

Sincerely,

Sean Supervisor

Fig 3A: Recipients Al and Donna receive the general composed message. Donna is BCC'd, so her information is not displayed on the header.

Recipient Cindy

FROM: Sean@MyEmail.com

TO: Al@MyEmail.com; Bob@MyEmail.com

CC: Cindy@MyEmail.com

SUBJECT: Meeting at 9 am

---Original Message--

There is a meeting for everyone at 9am.

Managers stay behind for 10 am follow-up meeting.

Sincerely,

Sean Supervisor

Fig 3B: Recipient Cindy receives the general composed message and the specific composed message designated to her.

Recipient Bob

FROM: Sean@MyEmail.com

TO: Al@MyEmail.com; Bob@MyEmail.com

CC: Cindy@MyEmail.com

SUBJECT: Meeting at 9 am

---Original Message--

There is a meeting for everyone at 9am.

Contractors can leave early at 9:30 am.

Sincerely,

Sean Supervisor

Fig 3C: Recipient Bob receives the general composed message and the specific composed message designated to him.

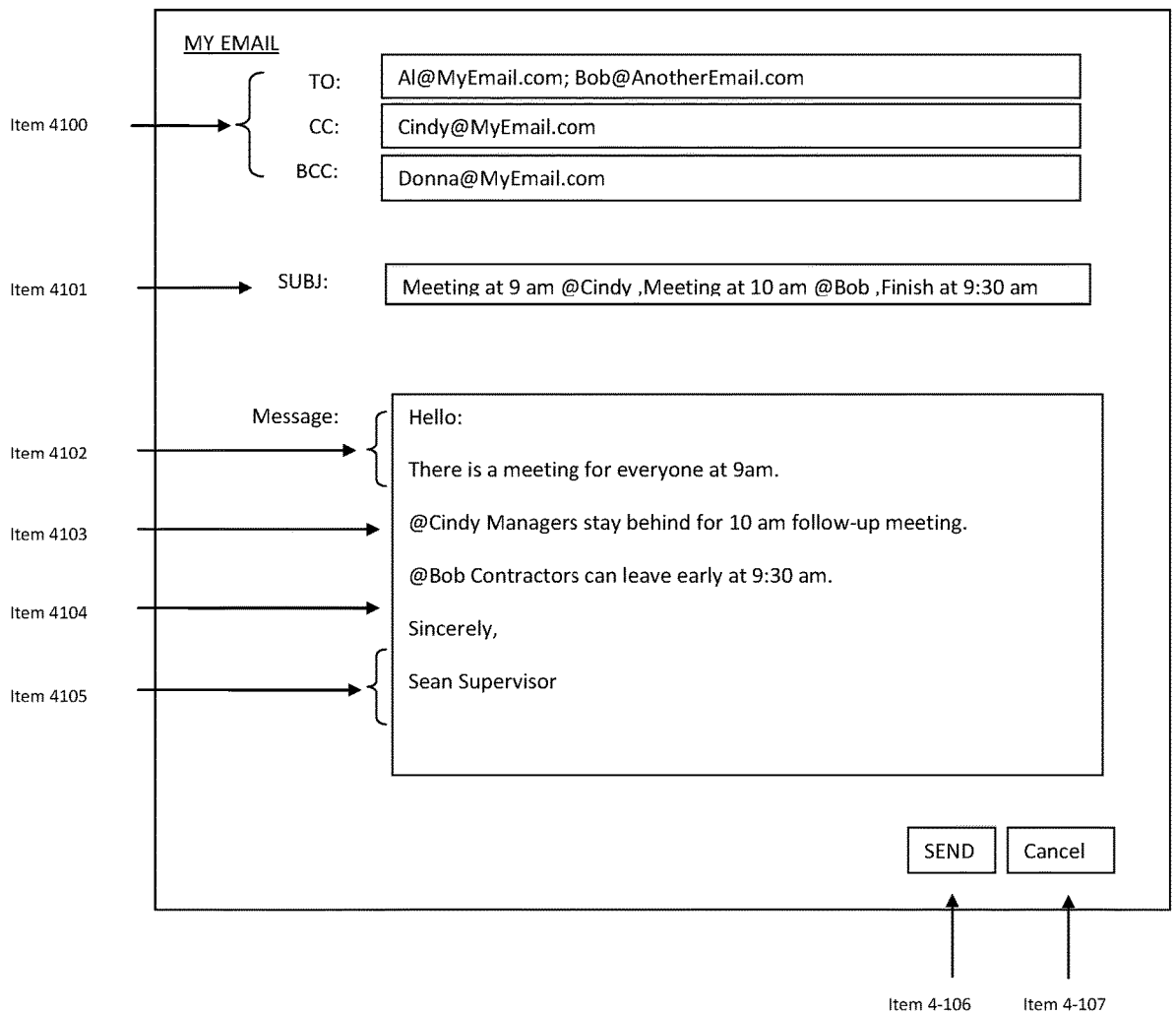
Fig 4: Different composed messages and subjects messages are sent individually through the same email. Items are labeled and categorized.

Recipients Al and Donna

```
FROM: Sean@MyEmail.com

TO: Al@MyEmail.com; Bob@MyEmail.com

CC: Cindy@MyEmail.com

Subject: Meeting at 9 am

---Original Message--

There is a meeting for everyone at 9am.

Sincerely,

Sean Supervisor
```

Fig 5A: Recipients Al and Donna receive the general composed message and the general subject message. Donna is BCC'd, so her information is not displayed on the header Recipient Cindy

---

FROM: Sean@MyEmail.com

TO: Al@MyEmail.com; Bob@MyEmail.com

CC: Cindy@MyEmail.com

SUBJECT: Meeting at 9 am, Meeting at 10 am

---Original Message--

There is a meeting for everyone at 9am.

Managers stay behind for 10 am follow-up meeting.

Sincerely,

Sean Supervisor

---

Fig 5B: Recipient Cindy receives the general composed message, the general subject message, the general specific composed message, and the specific composed message designated to her.

Recipient Bob

---

FROM: Sean@MyEmail.com

TO: Al@MyEmail.com; Bob@MyEmail.com

CC: Cindy@MyEmail.com

SUBJECT: Meeting at 9 am, Finish at 9:30 am

---Original Message--

There is a meeting for everyone at 9am.

Contractors can leave early at 9:30 am.

Sincerely,

Sean Supervisor

---

Fig 5C: Recipient Bob receives the general composed message, the general subject message, the general specific composed message, and the specific composed message designated to him.

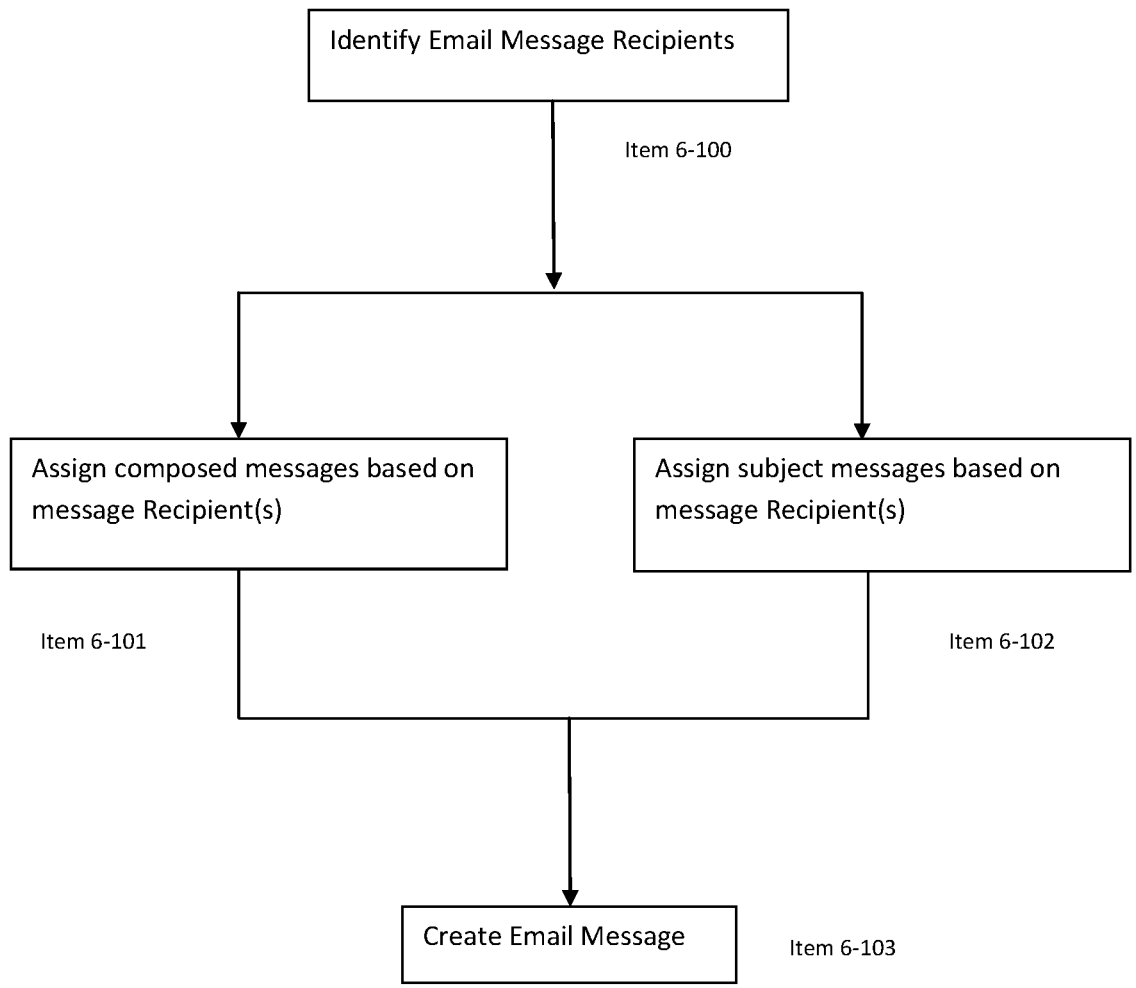
Fig 6: Process for assigning recipients for subject message and composed message

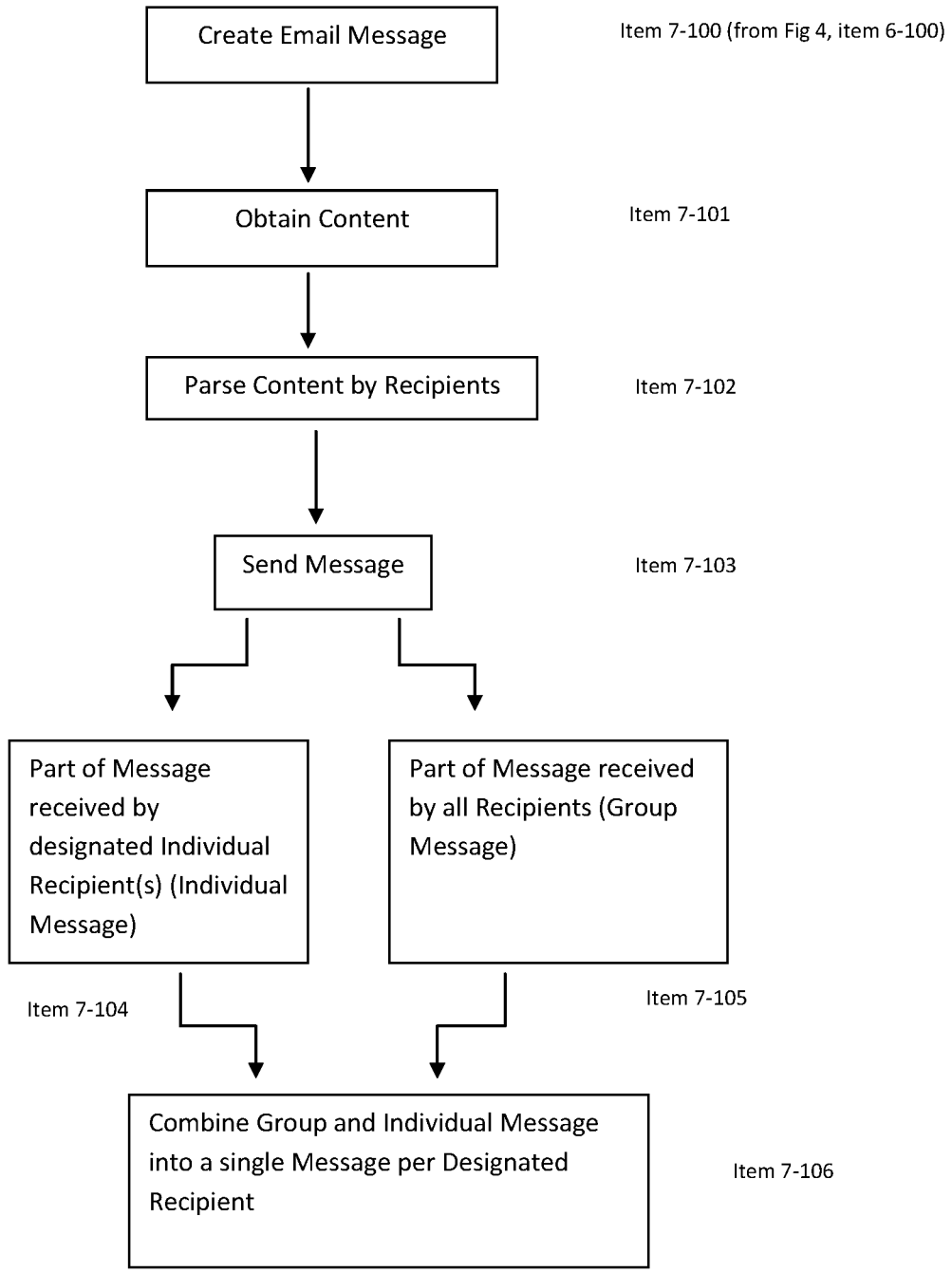
Fig 7: Process of sending combined group and individual message

DIFFERENT SPECIFIC MESSAGING TO MULTIPLE RECIPIENTS FROM A SINGLE MESSAGE

BACKGROUND OF THE INVENTION

The present invention is in the field of email messaging.

Conventional emails designate single or multiple recipients in a single message, but all receive the same message. However, the sender has to write multiple emails to different recipients if he wants to write different versions of the same message. This can be tedious and time consuming. The present invention allows multiple different messages to different recipients through a single email.

SUMMARY

The present invention allows multiple different messages to different recipients through a single email. The system allows a sender to designate multiple recipients in the subject areas and the composition areas of the email application and send different messages to each recipient.

BRIEF DESCRIPTION OF THE DRAWINGS

FIG. 1A is an illustrative GUI for a standard email application.

FIG. 1B is an illustrative GUI containing messages in a standard email application.

FIG. 1C is an illustrative example of recipients receiving email in a standard email application.

FIG. 2 is an illustrative GUI for different composed messages through a single email.

FIG. 3A is an illustrative example of specific recipients receiving a general composed message.

FIG. 3B is an illustrative example of specific recipients receiving a general composed message and a specific composed email.

FIG. 3C is an another illustrative example of specific recipients receiving a general composed message and a specific composed email.

FIG. 4 is an illustrative GUI for different composed messages and subject message headers through a single email.

FIG. 5A is an illustrative example of recipients receiving the general composed message.

FIG. 5B is an illustrative example of recipients receiving the general composed message, the specific composed message, the general subject message, and the specific composed message.

FIG. 5C is an another illustrative example of recipients receiving the general composed message, the specific composed message, the general subject message, and the specific composed message.

FIG. 6 is flowchart showing a process for assigning recipients for subject message and composed message.

FIG. 7 is flowchart showing a process for sending and receiving messages for both group and individual messages.

DETAILED DESCRIPTION

Figure 8:
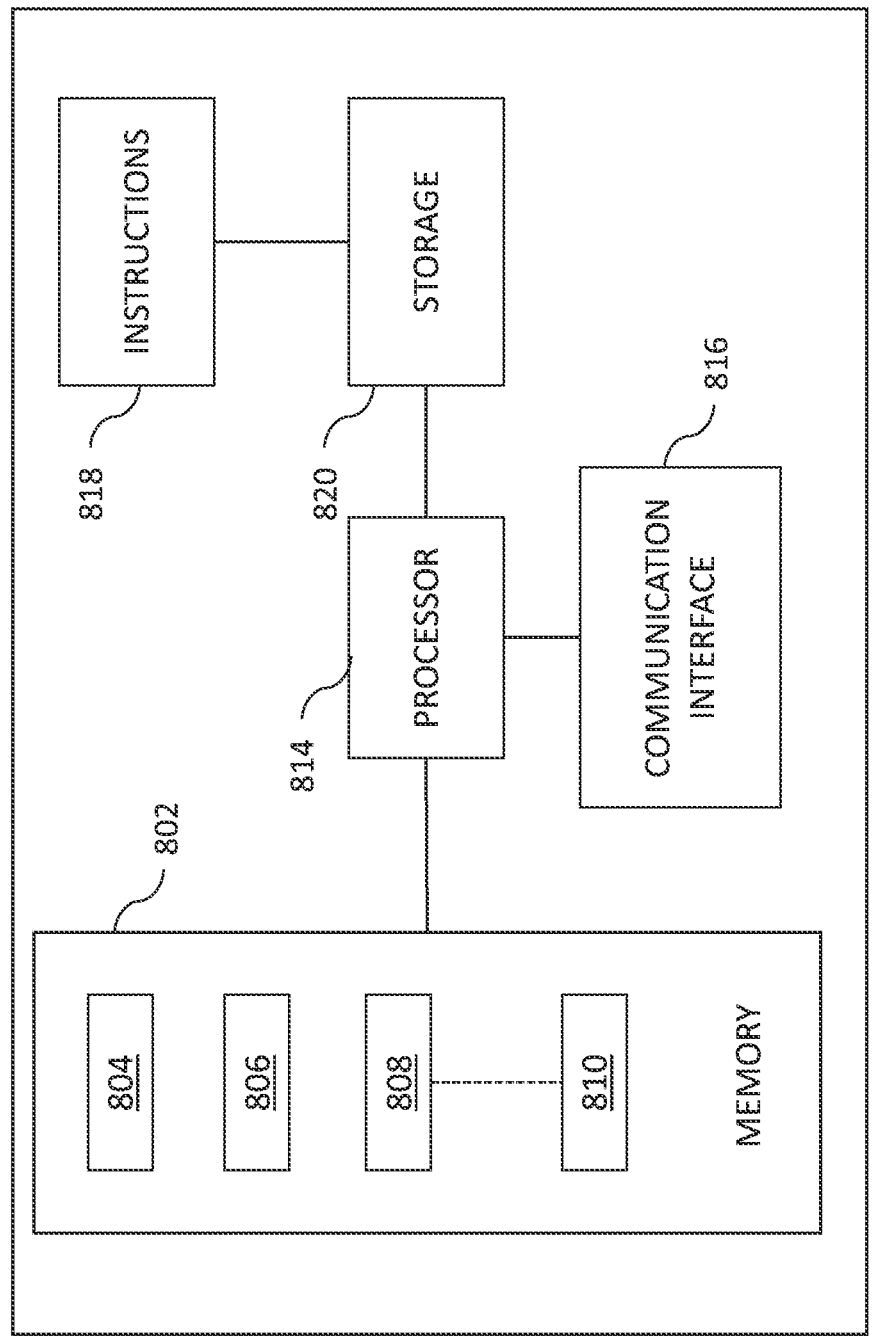
FIG. 8 illustrates a computer processor according to various aspects of the present disclosure.

Referring to the invention in more detail, FIG. 1A discloses details of a standard email application. The email application comprises of a recipient section (Item 1A100). The recipient section comprises a TO section, CC section, and BCC section. The email application also comprises a subject section (Item 1A101) and a message composition section (Item 1A102). The email application also comprises of a SEND command (Item 1A106) and of a Cancel command (Item 1A107).

FIG. 1B further discloses an exemplary use of FIG. 1A. where the TO, CC, and BCC comprises of email addresses for recipients (Item 1B100). In this example, the TO section comprises the email recipients: Al@MyEmail.com and Bob@AnotherEmail.com; the CC section comprises the email recipient: Cindy@MyEmail.com; and the BCC section comprises the email recipient: Donna@MyEmail.com (Item 1B100). The Subject section comprises the message: "Meeting at 9 am" (Item 1B101). The composition section, labeled Message (Item 1B102), comprises of the message:

Hello:

There is a meeting for everyone at 9 am.

Managers stay behind for 10 am follow-up meeting.

Contractors can leave early at 9:30 am.

Sincerely,

Sean Supervisor

FIG. 1C, discloses how all recipients of the email in FIG. 1B will view the email. The recipients will view the following message:

FROM: Sean@MyEmail.com

TO: Al@MyEmail.com; Bob@MyEmail.com

CC: Cindy@MyEmail.com

SUBJECT: Meeting at 9 am

--Original Message--

There is a meeting for everyone at 9 am.

Managers stay behind for 10 am follow-up meeting.

Contractors can leave early at 9:30 am.

Sincerely,

Sean Supervisor

Thus, FIGS. 1A, 1B, and 1C disclose the GUI and the process for sending and receiving emails in a standard email application.

FIG. 2 discloses one of several novel concepts in this current invention. Like FIGS. 1A and 1B, the email application comprises of a recipient section (Item 2100). The recipient section comprises a TO section, CC section, and BCC section. The email application also comprises a subject section (Item 2101) and a message composition section (Item 2102). The email application also comprises of a SEND command (Item 2106) and of a Cancel command (Item 2107).

FIG. 2 further discloses an exemplary use in that where the TO, CC, and BCC comprises of email addresses for recipients (Item 2100). In this example, the TO section comprises the email recipients: Al@MyEmail.com and Bob@AnotherEmail.com; the CC section comprises the email recipient: Cindy@MyEmail.com; and the BCC section comprises the email recipient: Donna@MyEmail.com (Item 2100). The Subject section comprises the message: "Meeting at 9 am" (Item 2101). The composition section, labeled Message, comprises of the message:

Hello:

There is a meeting for everyone at 9 am.

@Cindy Managers stay behind for 10 am follow-up meeting.

@Bob Contractors can leave early at 9:30 am.

Sincerely,

Sean Supervisor

In the message section, "Hello: There is a meeting for everyone at 9 am." (item 2102) and "Sincerely, Sean Supervisor" (item 2015) are labeled as general composed message because they do not have a recipient tag (i.e. @Cindy and @Bob) in front of it. The recipient tag @Cindy in item 2103 is linked to the recipient email Cindy@MyEmail.com in item 2100. The recipient tag @Bob in item 2103 is linked to the recipient email Bob@AnotherEmail.com in item 2100.

The message after the recipient links in items 2013 and 2014 are called specific composed message because the specific composed message is emailed directly to its corresponding recipient as designated by the recipient tag in front. For example, in reference to item 2103, the message "Managers stay behind for 10 am follow-up meeting." is sent only to Cindy because there is the recipient tag @Cindy in front of it. Also for example, in reference to item 2104, the message "Contractors can leave early at 9:30 am." is sent only to Bob because there is the recipient tag @Bob in front of it.

As a result of the input from FIG. 2, FIGS. 3A, 3B, and 3C disclose the results of the received email. In FIG. 3A, Al and Donna receive the following message:
FROM: Sean@MyEmail.com
TO: Al@MyEmail.com; Bob@MyEmail.com
CC: Cindy@MyEmail.com
SUBJECT: Meeting at 9 am
--Original Message--
There is a meeting for everyone at 9 am.
Sincerely,
Sean Supervisor Al and Donna receive the messages from only items 2102 and 2015. Al and Donna do not receives the messages from items 2103 and 2014 because those specific messages were designated only to Cindy and Bob respectively.

In FIG. 3B, Cindy receives the following message:
FROM: Sean@MyEmail.com
TO: Al@MyEmail.com; Bob@MyEmail.com
CC: Cindy@MyEmail.com
SUBJECT: Meeting at 9 am
--Original Message--
There is a meeting for everyone at 9 am.
Managers stay behind for 10 am follow-up meeting.
Sincerely,
Sean Supervisor Cindy receives messages from items 2102 and 2015 just as Al and Donna received. In addition, Cindy also receives messages from item 2103: "Managers stay behind for 10 am follow-up meeting." Cindy does not receive the message from item 2014 ("Contractors can leave early at 9:30 am.") because that specific message was designated only to Bob.

In FIG. 3C, Bob receives the following message:
FROM: Sean@MyEmail.com
TO: Al@MyEmail.com; Bob@MyEmail.com
CC: Cindy@MyEmail.com
SUBJECT: Meeting at 9 am
--Original Message--
There is a meeting for everyone at 9 am.
Contractors can leave early at 9:30 am.
Sincerely,
Sean Supervisor Bob receives messages from items 2102 and 2015 just as Al and Donna received. In addition, also receives messages from item 2104: "Contractors can leave early at 9:30 am." Bob does not receive the message from item 2014 ("Managers stay behind for 10 am follow-up meeting.") because that specific message was designated only to Cindy.

FIG. 4 discloses one of several novel concepts in this current invention. Like FIG. 2, the email application comprises of a recipient section (Item 4100). The recipient section comprises a TO section, CC section, and BCC section. The email application also comprises a subject section (Item 4101) and a message composition section (Item 4102). The email application also comprises of a SEND command (Item 4106) and of a Cancel command (Item 4107).

FIG. 4 further discloses an exemplary use in that where the TO, CC, and BCC comprises of email addresses for recipients (Item 4100). In this example, the TO section comprises the email recipients: Al@MyEmail.com and Bob@AnotherEmail.com; the CC section comprises the email recipient: Cindy@MyEmail.com; and the BCC section comprises the email recipient: Donna@MyEmail.com (Item 4100). The composition section, labeled Message, comprises of the message:
Hello:
There is a meeting for everyone at 9 am.
  @Cindy Managers stay behind for 10 am follow-up meeting.
  @Bob Contractors can leave early at 9:30 am.
Sincerely,
Sean Supervisor Also, in the message section, "Hello: There is a meeting for everyone at 9 am." (item 4102) and "Sincerely, Sean Supervisor" (item 4015) are labeled as general composed message because they do not have a recipient tag (i.e. @Cindy and @Bob) in front of it. The recipient tag @Cindy in item 4103 is linked to the recipient email Cindy@MyEmail.com in item 4100. The recipient tag @Bob in item 4103 is linked to the recipient email Bob@AnotherEmail.com in item 4100.

The message after the recipient links in items 4013 and 4014 are called specific composed message because the specific composed message is emailed directly to its corresponding recipient as designated by the recipient tag in front. For example, in reference to item 4103, the message "Managers stay behind for 10 am follow-up meeting." is sent only to Cindy because there is the recipient tag @Cindy in front of it. Also for example, in reference to item 4104, the message "Contractors can leave early at 9:30 am." is sent only to Bob because there is the recipient tag @Bob in front of it.

However, unlike FIG. 2, the Subject section in FIG. 4 comprises the message: "Meeting at 9 am @Cindy ,Meeting at 10 am @Bob ,Finish at 9:30 am" (Item 4101). Thus ",Meeting at 10 am" is linked to Cindy@Myemail.com and "@Bob ,Finish at 9:30 am" is linked to Bob@AnotherEmail.com.

Thus, the messages "Meeting at 10 am" (item 4101) and "Managers stay behind for 10 am follow-up meeting." (item 4103) are linked to Cindy@myEmail.com. Likewise, the Subject message "Finish at 9:30 am" (item 4101) and "Contractors leave at 9:30 am." (item 4104) are linked to Bob@AnotherEmail.com.

As a result of the input from FIG. 4, FIGS. 5A, 5B, and 5C disclose the results of the received email by the recipients. In FIG. 5A, Al and Donna receive the following message:
FROM: Sean@MyEmail.com
TO: Al@MyEmail.com; Bob@MyEmail.com
CC: Cindy@MyEmail.com
SUBJECT: Meeting at 9 am
--Original Message--
There is a meeting for everyone at 9 am.
Sincerely,
Sean Supervisor Al and Donna receive the messages from only items 4102 and 4015. Al and Donna do not receives the messages from items 4103 and 4014 because those specific messages were designated only to Cindy and Bob respectively. Moreover, Al and Donna do not receive the specific subject messages thus ", Meeting at 10 am" and ",Finish at 9:30 am" because they are linked to Cindy and Bob respectively.

In FIG. 3B, Cindy receives the following message:
FROM: Sean@MyEmail.com
TO: Al@MyEmail.com; Bob@MyEmail.com
CC: Cindy@MyEmail.com
SUBJECT: Meeting at 9 am, Meeting at 10 am
--Original Message--
There is a meeting for everyone at 9 am.
Managers stay behind for 10 am follow-up meeting.
Sincerely,
Sean Supervisor Cindy receives messages from items 4102 and 4015 just as Al and Donna received. In addition, Cindy also receives messages from item 4101: "Managers stay behind for 10 am follow-up meeting." In addition, Cindy also receives the subject message: ", Meeting at 10 am" (item 4101). Cindy does not receive the message from item 4014 ("Contractors can leave early at 9:30 am.") because that specific message was designated only to Bob. Also, Cindy does not receive the subject message from item 4011 (",Finish at 9:30 am") because that specific message was designated only to Bob.

In FIG. 3C, Bob receives the following message:
FROM: Sean@MyEmail.com
TO: Al@MyEmail.com; Bob@MyEmail.com
CC: Cindy@MyEmail.com
SUBJECT: Meeting at 9 am, Finish at 9:30 am
--Original Message--
There is a meeting for everyone at 9 am.
Contractors can leave early at 9:30 am.
Sincerely,
Sean Supervisor Bob receives messages from items 4102 and 4015 just as Al and Donna received. In addition, also receives messages from item 4104: "Contractors can leave early at 9:30 am." In addition, Bob also receives the subject message: ", Meeting at 9:30 am" (item 4101). Bob does not receive the message from item 4014 ("Managers stay behind for 10 am follow-up meeting.") because that specific message was designated only to Cindy. Also, Bob does not receive the subject message from item 4011 (",Meeting at 10 am") because that specific subject message was designated only to Cindy.

FIGS. 6 and 7 disclose flow charts on how the specific multi-messaging process works. In FIG. 6, the sender places the recipient emails in the appropriate boxes as in FIG. 2, item 2100 and FIG. 4, item 4100. The system them identifies the emails message recipients (item 6-100). then the system assigns the parts of the composed message based on the recipients (item 6-101). This is also demonstrated in FIG. 2, item 4103 and FIG. 4, items 4103 and 4104. The system also assigns the subject message based on the recipients (item 6-102). This is also demonstrated in FIG. 4 item 4101. This allows the system to designate the recipients to the specific messages and tie it into a general message and thus create an email message (item 6-103).

In FIG. 7, once the email message is created (FIG. 6, 6-103 and FIG. 7, 7-100), the system obtains (item 7-101) and parses the content (item 7-102) based on recipients. The system parses the content to designate between a general message (subject and composition) and specific message (subject and composition). The system then sends the message (item 7-103). Once the message is sent, the message is split into a portion of the message received by individuals (items 7-104) and portion of the messages received by all recipients (i.e. group message) (item 7-105). The system recombines the group and the individual portions of the message appropriately per designated user (item 7-106).

FIG. 8 illustrates a controller 800 (or system 800), according to the embodiments. The controller 800 may be included with the battery analytics module 404 illustrated in FIG. 4. The controller 800 can include a processor 814 having a specific structure relating to battery pack management and monitoring.

This application-specific structure can be imparted to the processor 814 by instructions stored in a memory 802 and/or by instructions 818 fetchable by the processor 814 from a storage medium 820. The storage medium 820 may be co-located with the controller 800 as shown, or it can be remote and communicatively coupled to the controller 800. Communications between the controller 800, via a communication interface 816, and a remote device can be encrypted and/or anonymized using known methods of encryption or data anonymization.

The controller 800 can be a stand-alone programmable system, or a programmable module included in a larger system. The controller 800 may include one or more hardware and/or firmware/software components configured to fetch, decode, execute, store, analyze, distribute, evaluate, and/or categorize information.

The processor 814 may include one or more processing devices or cores (not shown). In some embodiments, the processor 814 may be a plurality of processors, each having either one or more cores. The processor 814 can execute instructions fetched from the memory 802, i.e. from one of memory modules 804, 806, 808, or 810.

The invention claimed is:

1. A method for sending emails using an application, the method comprising:
   using a graphical user interface (GUI) for a single email using via an email application being executed in a memory of a computer processor, the email application, when executed, causing the processor to:
   designate, by a sender input at a time of creation of the single email, two or more recipients in an addressee area of a single email graphical user interface (GUI);
   designate, by the sender input at the time of creation of the single email, two or more subjects in a subject area of the single email GUI, each subject corresponding to only one of the two or more recipients;
   enter two or more messages in a composition area of the single email GUI,
   wherein each of the two or more messages corresponds to a respective one of the two or more subjects; and
   wherein after the single email including the two or more messages is transmitted, (i) a first of the two or more recipients only receives a first of the two or more messages, the first of the two or more messages, corresponding to the respective subject, and (ii) each of the other of the two or more recipients only receives a second of the two or more messages, the second of the two or more messages corresponding to the other respective subject.

* * * * *